US008271751B2

(12) United States Patent
Hinrichs, Jr.

(10) Patent No.: US 8,271,751 B2
(45) Date of Patent: Sep. 18, 2012

(54) SYSTEMS AND METHODS FOR RELIABLY MANAGING FILES IN A COMPUTER SYSTEM

(75) Inventor: Joel Henry Hinrichs, Jr., Centennial, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1055 days.

(21) Appl. No.: 12/109,019

(22) Filed: Apr. 24, 2008

(65) Prior Publication Data
US 2009/0271581 A1 Oct. 29, 2009

(51) Int. Cl.
*G06F 12/00* (2006.01)
*G06F 13/00* (2006.01)
*G06F 13/28* (2006.01)

(52) U.S. Cl. ........ 711/161; 711/162; 711/105; 711/156; 707/639; 707/649; 707/650; 714/6.1; 714/6.2; 714/6.3

(58) Field of Classification Search .................. 711/161, 711/162, 105, 156; 707/639, 649, 650; 714/6.1, 714/6.2, 6.3
See application file for complete search history.

(56) References Cited

U.S. PATENT DOCUMENTS

| | | | |
|---|---|---|---|
| 5,422,762 A | 6/1995 | Jerbic | |
| 5,715,455 A | 2/1998 | Macon, Jr. et al. | |
| 5,819,298 A | 10/1998 | Wong et al. | |
| 5,968,186 A | 10/1999 | Itoh et al. | |
| 6,195,217 B1 | 2/2001 | Park | |
| 6,199,178 B1 * | 3/2001 | Schneider et al. | 714/21 |
| 6,815,112 B2 | 11/2004 | Saito et al. | |
| 6,829,688 B2 | 12/2004 | Grubbs et al. | |
| 6,898,686 B1 | 5/2005 | Perez | |
| 6,961,941 B1 * | 11/2005 | Nelson et al. | 719/319 |
| 7,372,873 B1 * | 5/2008 | Kumar et al. | 370/484 |
| 7,457,910 B2 | 11/2008 | Chang et al. | |
| 7,464,103 B2 | 12/2008 | Siu et al. | |
| 7,676,628 B1 | 3/2010 | Compton et al. | |
| 7,873,619 B1 | 1/2011 | Faibish et al. | |
| 2002/0093691 A1 | 7/2002 | Durrant et al. | |
| 2004/0030951 A1 | 2/2004 | Armangau | |

(Continued)

FOREIGN PATENT DOCUMENTS

KR 20060095393 8/2006

(Continued)

OTHER PUBLICATIONS

Krishnan, Swetha et al., "The Effects of Metadata Corruption on NFS"; Department of Computer Sciences, University of Wisconsin-Madison; StorageSS '07; Oct. 29, 2007.

(Continued)

*Primary Examiner* — Stephen Elmore
*Assistant Examiner* — Mark Giardino, Jr.
(74) *Attorney, Agent, or Firm* — Ingrassia Fisher & Lorenz, P.C.

(57) ABSTRACT

Systems and methods allow for reliably and efficiently managing files stored on a data storage medium associated with a computer system such as a set-top box. The computer system manages a collection of metadata describing each of the files stored on the data storage medium in a memory during operation of the computer system. A current snapshot of the collection of metadata is periodically or otherwise stored to the data storage medium. Following a reboot of the computer system, the collection of metadata can be recovered to the memory from the snapshot of the collection of metadata stored on the data storage medium.

22 Claims, 5 Drawing Sheets

U.S. PATENT DOCUMENTS

| | | | |
|---|---|---|---|
| 2004/0123057 | A1 | 6/2004 | Freudenschuss et al. |
| 2004/0148470 | A1 | 7/2004 | Schulz |
| 2004/0158834 | A1 | 8/2004 | Ham et al. |
| 2005/0027748 | A1* | 2/2005 | Kisley .................. 707/200 |
| 2005/0149776 | A1 | 7/2005 | Hinrichs |
| 2005/0193232 | A1 | 9/2005 | Diehl |
| 2006/0117133 | A1 | 6/2006 | Hinrichs |
| 2007/0033356 | A1* | 2/2007 | Erlikhman ................ 711/162 |
| 2007/0067554 | A1 | 3/2007 | Hinrichs |
| 2007/0220490 | A1 | 9/2007 | Kobayashi et al. |
| 2008/0072219 | A1 | 3/2008 | Kabadiyski |
| 2008/0148233 | A1 | 6/2008 | Clemm et al. |
| 2008/0270719 | A1* | 10/2008 | Cochran et al. ............ 711/162 |
| 2009/0172276 | A1 | 7/2009 | Nochimowski et al. |
| 2009/0222509 | A1 | 9/2009 | King et al. |
| 2010/0191779 | A1 | 7/2010 | Hinrichs |

FOREIGN PATENT DOCUMENTS

| | | |
|---|---|---|
| WO | 9716023 | 5/1997 |
| WO | 2006020094 A2 | 2/2006 |

OTHER PUBLICATIONS

Hutchinson, Normal C. et al., "Logical vs. Physical File System Backup"; originally published in the Proceedings of the 3rd Symposium on Operating Systems Design and Implementation, New Orleans, Louisiana, Feb. 1999.

Digital Research, "CP/M-86 Operating System System Guide," 1981.

Wikipedia, "File Allocation Table," article from the Internet at http://en.wikipedia.org/w/index.php?title=File_Allocation_Table&printable=yes, Apr. 24, 2008, pp. 1-22.

USPTO "Non-Final Office Action" mailed Mar. 24, 2011; U.S. Appl. No. 12/360,608, filed Jan. 27, 2009.

European Patent Office International Searching Authority "International Search Report," mailed Jul. 24, 2009; International Application No. PCT/US2009/041567, International filing date Apr. 23, 2009.

European Patent Office, International Searching Authority, "International Search Report and Written Opinion," mailed Sep. 6, 2010; International Application PCT/US2010/021750, filed Jan. 22, 2010.

* cited by examiner

| BYTES | OFFSET | FIELD | SIGNIFICANCE |
|---|---|---|---|
| 4 | 0 | checkSumA | Validates metadata |
| 4 | 4 | checkSumB | Validates metadata |
| 4 | 8 | checkSumC | Validates metadata |
| 16 | 12 | id | Partition name |
| 4 | 28 | sequence | Defines saved snapshot order |
| 4 | 32 | MAUSizeInSectors | Data granule size |
| 4 | 36 | start | Absolute from start of /dev/sda# |
| 4 | 40 | end | Absolute from start of /dev/sda# |
| 4 | 44 | sizeInMAU | Useable size of the partition |
| 12 | 48 | workingMAU | FREE_MAU: MAUs currently available for use |
| 12 | 60 | n0MAU | FREE_MAU: MAUs being freed, this snapshot cycle |
| 12 | 72 | n1MAU | FREE_MAU: MAUs freed, last snapshot cycle |
| 12 | 84 | n2MAU | FREE_MAU: MAUs freed second-last snapshot cycle |
| 4 | 96 | FATTable | Pointer to array of MAP_ELEMENTs |
| 4 | 100 | Text | Pointer to array of TEXT_CHAINs |
| 4 | 104 | DirTable | Pointer to array of DIR_DESCs |
| 4 | 108 | FileTable | Pointer to array of FILE_DESCs |
| 4 | 112 | metaDataBytes | Size of snapshot |
| 4 | 116 | ElementMaxx | Size of FAT array |
| 4 | 120 | freeThis | As-allocated current metadata location |
| 16 | 124 | metadataMAU[3] | Absolute sector numbers from start of /dev/sda# |
| 4 | 140 | changesSinceLastFlush | Counts metadata changes since last update |
| 2 | 144 | handleCounter | Makes each xxx_HANDLE unique |
| 2 | 146 | TextMaxx | Size of TEXT_CHAIN array |
| 2 | 148 | NextText | Index of first free TEXT_CHAIN struct |
| 2 | 150 | LastText | Index of last free TEXT_CHAIN struct |
| 2 | 152 | numText | Count of free TEXT_CHAIN structs |
| 2 | 154 | DirMaxx | Size of DIR_DESC array |
| 2 | 156 | NextDir | Index of first free DIR_DESC struct |
| 2 | 158 | LastDir | Index of last free DIR_DESC struct |
| 2 | 160 | numDir | Count of free DIR_DESC structs |
| 2 | 162 | FileMaxx | Size of FILE_DESC array |
| 2 | 164 | NextFile | Index of first free FILE_DESC struct |
| 2 | 166 | LastFile | Index of last free FILE_DESC struct |
| 2 | 168 | numFile | Count of free FILE_DESC structs |
| 2 | 170 | metaDataSizeInSectors | Number of sectors (in full MAUs) dedicated per snapshot |
| 2 | 172 | changesActive | Number of active metadata-changing operations |
| 2 | 174 | operationsActive | Number of active op's that DON'T change metadata |
| 1 | 176 | fsckCopy | Indexes fsck() metadata copy, per set in lost+found |
| 1 | 177 | fsckSet | Indexes fsck() metadata set in lost+found |
| 1 | 178 | operationsStopped | Blocks all user operations |
| 1 | 179 | changesStopped | Blocks metadata changes |
| 1 | 180 | readOnly | Blocks all write operations |
| 1 | 181 | elementDim | Number of MAUs mapped per ELEMENT |
| 1 | 182 | elementSize | MAU ELEMENT size in bytes |
| 1 | 183 | metaDataIdx | Rotates thru metaDataMAU |
| 1 | 184 | logMAUsize | number of bits required to index a MAU |
| 1 | 185 | iDevice | Device's index to EFS_MBRTable |
| 1 | 186 | iSelf | On index into EFS_PartitionTable |
| 1 | 187 | packing | |
| | 188 | | STRUCT SIZE (Exemplary) |

FIG. 3

SYSTEMS AND METHODS FOR RELIABLY MANAGING FILES IN A COMPUTER SYSTEM

TECHNICAL FIELD

The present invention generally relates to computer file systems, and more particularly to systems and methods for reliably managing files stored in a computer system. The file management systems and methods may be used, for example, in a computer system used to implement a set-top box for processing received television or other audio/video signals.

BACKGROUND

Most television viewers now receive their television signals through a content aggregator such as a cable or satellite television provider. In the typical instance, encoded television signals are sent via a cable or wireless data link to the viewer's home, where the signals are ultimately decoded in a set-top box (STB) or other computing system. The decoded signals can then be viewed on a television or other appropriate display as desired by the viewer.

More recently, STBs and other computing systems have become more advanced, and now provide more features than were previously available. Many STBs, for example, now provide personal video recorder (PVR) functionality whereby programs contained within received signals are stored on a disk drive or other storage medium for later viewing. With the advent of PVR and other advanced features, many computing devices used in video processing now include hard disk or other data storage devices to increase the capability to store video and other content for subsequent enjoyment.

While the addition of mass storage to STBs and other computing systems can greatly improve the convenience and functionality for the customer, this new capability often comes with new engineering and operations issues. Access times for disk reads and writes, for example, can be relatively slow in comparison to reads and writes to memory, which in turn can affect the responsiveness or other performance of the system. Moreover, in the event of a sudden power-off or other unpredictable event, the data on the disk or other storage device can become corrupt or otherwise difficult to use. While various file management systems have been attempted with varying levels of success, there nevertheless remains a desire to increase efficiency and robustness of file management.

It is therefore desirable to create systems and processes for managing files in a set-top box or other computing system. These and other desirable features and characteristics will become apparent from the subsequent detailed description and the appended claims, taken in conjunction with the accompanying drawings and this background section.

BRIEF SUMMARY

In various embodiments, systems and methods allow for reliable and efficient management of files stored on a data storage medium associated with a computer system such as a set-top box. The computer system manages a collection of metadata describing each of the files stored on the data storage medium in a memory during operation of the computer system. A current snapshot of the collection of metadata is periodically or otherwise stored to the data storage medium. Following a reboot of the computer system, the collection of metadata can be recovered to the memory from the snapshot of the collection of metadata stored on the data storage medium.

In other embodiments, a computer system is provided that comprises a data bus, a memory coupled to the data bus, a data storage medium coupled to the data bus that is configured to store a plurality of files, and a processor. The processor is configured to format a collection of metadata comprising information associated with each of the plurality of files stored on the data storage medium, to maintain the collection of metadata entirely in the memory during operation of the computer system, and to store a snapshot of the collection of metadata to the data storage medium.

In yet another embodiment, a set-top box or other computer system is provided for producing imagery on a display in response to a received audio/visual signal comprising at least one program. The computer system includes a memory, as well as an input interface configured to receive the audio/visual signal and a video interface configured to provide an output signal representative of the imagery to the display, as well as a memory and a disk drive configured to store a plurality of files. A processor in communication with the input interface, the video interface, the memory and the disk drive is provided that is configured to generate the output signal in response to the received audio/visual signal, to store the at least one program as one of the plurality of files on the disk drive, to maintain a collection of metadata comprising information associated with each of the plurality of files stored on the data storage medium entirely in the memory during standard operation of the computer system, to periodically store a plurality of snapshots of the collection of metadata to the data storage medium, and to recover the collection of metadata from at least one of the plurality of snapshots following a reboot of the computer system.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram showing an exemplary computing system capable of generating imagery on a display;

FIG. 3 is a data structure diagram showing an example of partition metadata that could be used in one embodiment;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various exemplary embodiments, speed and robustness of a file system associated with a disk drive or other storage medium is greatly improved by managing file system metadata primarily, if not entirely, within system memory. The metadata can be managed to allow for the complete collection of metadata associated with a disk partition to be stored within system memory, thereby reducing or eliminating the need to access the disk or other media for many tasks. Moreover, a snapshot of the entire collection of metadata can be effectively stored to the disk (or other media) on a periodic or other basis, thereby allowing for very effective recovery in the event of a crash, shutdown or other event. Indeed, multiple "snapshots" of the metadata can be stored for subsequent verification and retrieval, thereby greatly improving the likelihood that at least one valid image of the metadata will survive a crash or other event, thereby allowing for convenient restoration of the metadata in memory. By efficiently managing file system metadata in memory rather than on the disk or other media, then, a low overhead file system can be provided that has very good recovery following a crash, reboot or other event.

For convenience, the concepts presented herein are frequently described with reference to a set-top box or similar system that is capable of generating television or other video imagery on a display. The invention is not so limited, however, and indeed the systems and methods described herein may be readily adapted and deployed in any other type of computing systems. Examples of other computing systems that could incorporate the concepts described herein include audio or video media players, personal digital assistants, personal video recorders, video game players, satellite or terrestrial radio receivers, audio/video systems and components (e.g. compact disc or digital video disc players; audio or video components associated with automobiles, aircraft or other vehicles; stereo receivers and/or amplifiers; jukeboxes and/or the like), portable telephones and/or any other devices or systems. Indeed, any device or system that incorporates a storage device (such as a disk drive) and that has a manageable set of file system metadata could benefit from the concepts described herein.

Figure 1:
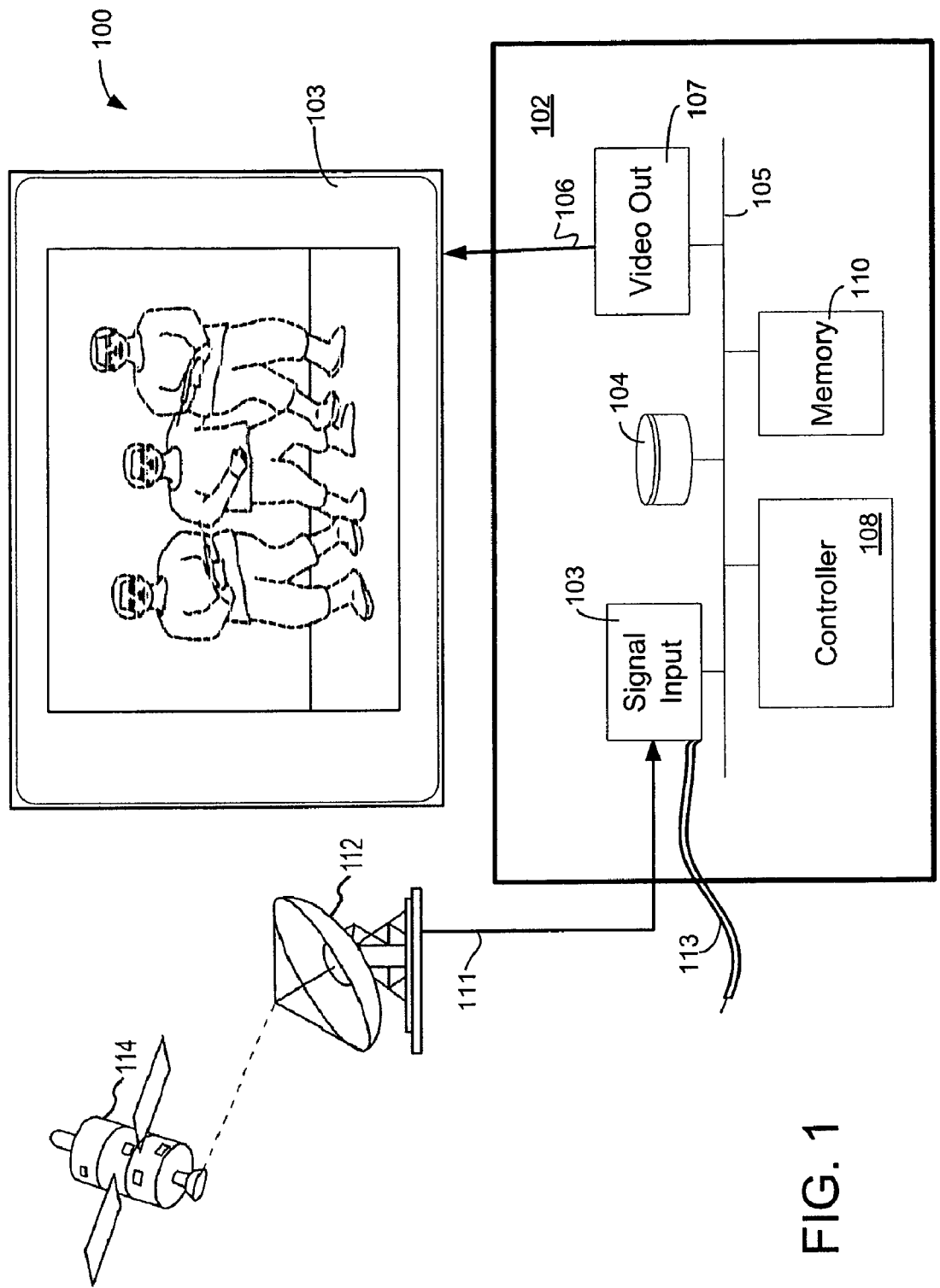

Turning now to the drawing figures, FIG. 1 shows an exemplary system 100 that could be used to present received television imagery on a display 103. In the embodiment shown in FIG. 1, computing system 102 is shown as a set-top box (STB) or other device capable of receiving television or similar content from a cable or satellite television provider and of generating a suitable output signal 106 in response to user inputs. In such embodiments, computing system 102 is configured with one or more conventional interfaces 103 to receive signals 111 received from a wireless antenna 112, which in turn may receive wireless programming and other content from a satellite 114 and/or from any terrestrial-based transmitter. Alternatively or additionally, computing system 102 may include any number of interfaces 103 to cable television signals and/or any other wired inputs 113. Other sources of television inputs that may be present in other embodiments include high or low definition broadcast sources, wireless or wired transmissions using any sort of broadcast, point-to-point or other transmit schemes, closed circuit television signals in any format, and/or other sources as appropriate. Many types of wired and wireless interfaces 103 for various types of computing devices 102 are widely known, and any presently-known or subsequently developed interfaces may be used in various equivalent embodiments.

In a typical embodiment, computing system 102 includes any sort of processing or control circuitry 108 as well as associated memory 110 and data storage 104 communicating with processor 108 via a bus or other data connection 105. Various embodiments of processor 108 include any sort of microcontroller or microprocessor executing any form of software code. Memory 110 may include any sort of digital memory (including any sort of read only memory, random access memory, flash memory and/or the like). Computing system 102 also includes a data storage medium 104, which is any sort of mass storage device, including any sort of disk drive or other magnetic, optical or other storage capable of storing data, instructions and/or the like. Files and directories on storage medium 104 can be efficiently managed with memory-resident metadata, as described more fully below.

In operation, computing system 102 is able to receive television programming or other input data via any wired or wireless connection (e.g. interfaces 111 and 113 in FIG. 1). Imagery presented on display 103 may be directed using any number of control signals 106, which are provided from interface 107 in any digital or analog format (e.g., any format compatible with display 103). This operation generally takes place under the control of any appropriate hardware, software and/or firmware within computing system 102. In a set-top box with PVR functionality, for example, processor 108 is able to receive a program contained within input signals 111/113 and to store the received program as a data file on data storage device 104. The stored file may be later retrieved (e.g., in response to user inputs) for presentation on display 103 as desired.

In a typical embodiment, software or firmware instructions for carrying out the various features provided by computing system 102 are stored in storage media 104 and/or memory 110 for execution by processor 108 as appropriate. Again, equivalent embodiments may not relate to set-top boxes at all, but rather to media players, audio/visual components and/or other computing devices as appropriate. Such other embodiments may therefore exhibit different and/or additional components to those shown in FIG. 1; in particular, the input and output interfaces 103 and 107 may be omitted or provided in a different manner in such embodiments.

Figure 2:
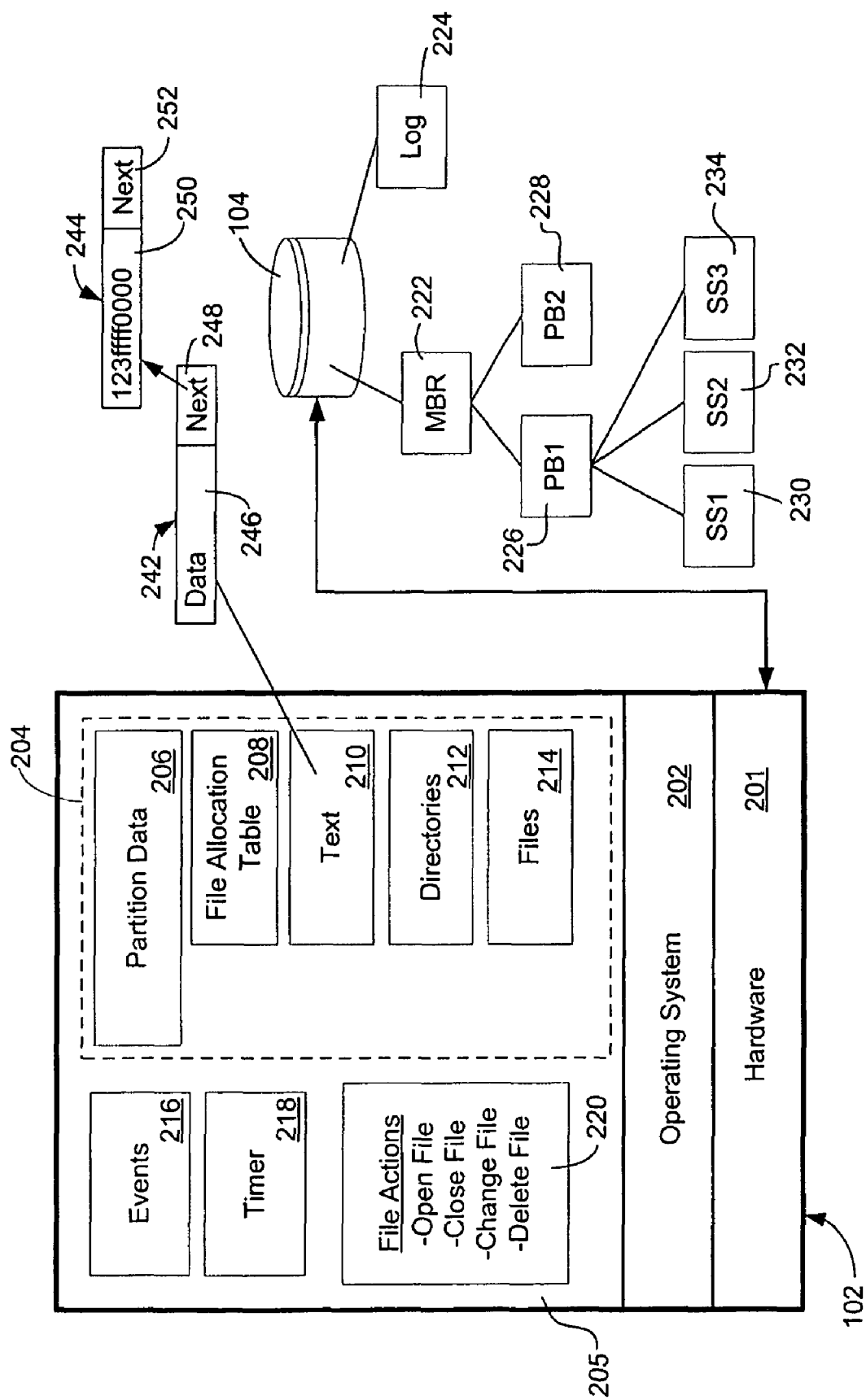
FIG. 2 is a block diagram showing various logical components of an exemplary computing system.

FIG. 2 is a more detailed block diagram of an exemplary computing system 102 that is capable of processing memory-resident metadata for a disk drive or other data storage medium 104. With reference to FIG. 2, computing system 102 contains any sort of hardware 201 (such as described above) that suitably interacts with a file system 205 that is resident in system memory (e.g. memory 110 in FIG. 1) via any conventional computer operating system 202. In an exemplary embodiment, operating system 202 is any version of the LINUX operating system, although equivalent embodiments could be built upon any version of Microsoft Windows, MacOS, UNIX and/or any other operating systems or other platforms executing on any computing platforms. File system 205 may be implemented as a conventional software program (or set of programs) written in any programming language for interpretation or execution on computing system 102 using conventional software development techniques. Version 2.6 of the LINUX operating system, for example, contains a "filesystem in user context (FUSE)" capability that allows developed applications to operate as though part of the system kernel even though the programs themselves reside in user address space.

File system 205 includes programs, routines or other interfaces 220 for taking various file-related actions such as opening, closing, reading, writing, finding and/or deleting files, as well as other features as appropriate. Various directory-related actions may also be provided, such as making (e.g., "mkdir") and removing directories (e.g., "rmdir"), listing the contents of a directory, changing directories and/or the like. General file system commands for making a file system ("mkfs"), mounting or unmounting a drive volume, checking a volume ("fsck"), and/or the like may also be provided.

Each feature and function provided by the various interfaces 220 is designed to use file system metadata 204, which resides in system memory (e.g., memory 110 in FIG. 1)

during standard operation of computing system 102. When the file system 205 opens, closes, alters and/or deletes a file or directory, for example, such an action may change not only the content of the file itself, but also the file system's metadata 204, which is used to organize the file system. Metadata 204 includes information about every file and directory residing within the file system, and includes such information as parent/child connections making up the directory tree, file name, file state (e.g., open for read, open for write), size, location(s) in storage device 104, read/write/execute permissions, modification time, access time and/or the like. Metadata 204 also records the locations of vacant storage areas for files to expand into and/or for new files to occupy.

Unlike most conventional file systems (e.g., file systems based upon conventional inode models), metadata 204 may be managed efficiently in memory 110, thereby dramatically reducing (if not eliminating) the need to impede file data operations with relatively continuous metadata updates. Moreover, maintaining the metadata 204 in memory 110 allows for highly reliable image "snapshots" to be saved on the storage device for convenient recovery in the event of a crash or shutdown, as described more fully below.

In the embodiment shown in FIG. 2, file system 205 includes a set of metadata 204 that includes various structures relating to partition data 206, file allocation 208, textual data 210, directory descriptors 212 and file descriptors 214, as appropriate. Partition data 206 suitably includes any information relating to the entire storage partition, such as the name and location of the partition, pointers to the various other tables (e.g., structures 208, 210, 212, 214), and other information as appropriate. A more detailed description of an exemplary partition data structure 206 is provided below with reference to FIG. 3.

File allocation table (FAT) data is contained within an array of data structures contained within structure 208. Unlike conventional inode implementations, file allocation tables are able to flexibly yet efficiently maintain file information. Structure 208 therefore maintains a table of disk sector information associated with the various files and directories.

In various embodiments, file system 205 allocates space in data storage medium 104 based upon any suitable minimum allocation unit (MAU). A MAU is simply any convenient block of contiguous space in data storage medium that can be individually indexed, allocated, and/or otherwise processed. In various embodiments, the MAU may be arbitrarily defined as a block of about 4 megabytes (e.g., about 8192 conventional disk sectors). In embodiments (such as set-top boxes) that can be expected to track a relatively low number of files, but with each file being relatively large in size, such a large MAU may be appropriate; other embodiments, however, may use widely varying values or may not use MAUs at all. In embodiments that make use of MAU constructs, FAT data stored within structure 208 may be maintained for each MAU within the partition of interest.

In various embodiments, FAT structure 208 tracks both allocated and unallocated disk sectors using a linked list structure or the like. That is, data structures representing each MAU/element can be linked to each other in a chain of "allocated" elements or "unallocated" elements, as appropriate. In such embodiments, a location of a first map element (e.g., a first MAU) is identified (e.g., with an address or index value stored in partition data 206 or the like), with each element in the chain storing an index to the next element. By traversing the chain of index values, then, each map element in the array can be accessed. The end of the chain may be indicated by storing a particular value (e.g., a "−2" or "$0xFFFE", although other embodiments may use any other value) in the index field. To add an element to the chain, then, the end marker value in the last chain element is simply replaced with an appropriate index value, and the new element becomes the last element the chain. Deleting any particular element simply involves adjusting the index values of the elements on either side of the deleted element so that the chain indexes remain accurate. Elements added or deleted to any particular set of metadata 204 are tracked through several snapshot cycles to prevent conflicts; this is described more fully below.

Textual data 210 may be similarly stored in a linked list-type structure as appropriate. In various embodiments, it is desirable to make efficient use of memory space allocated to metadata 204 by assigning relatively small "blocks" of memory on an as-needed basis to store textual data. To accomplish this, each text block 242, 244 suitably includes a data field 246, 250 and an index field 248, 252 (respectively) that contains a pointer or index to a subsequent structure. In an exemplary embodiment, each text structure 242, 244 is capable of storing about eight bytes of text in data field 246, 250 and a two-byte index in index field 248; other embodiments may use widely differing absolute and relative values. Text structures 242, 244 therefore form linked chains similar to the FAT chains described above. By traversing any text chain from a starting point until an occurrence of a known terminating value (e.g., 0xFFFF, although other embodiments may use any other value), text strings of virtually any length can be stored and retrieved in a very efficient manner. The relatively few bytes of data field 246, 250 that follow the last significant text character may be padded with zeros, ones, or other values as desired. Unlike conventional inode structures, which are notoriously inefficient in terms of text storage, the linked structure described herein allows for very effective management of metadata 204.

Information regarding directories and files in file system 205 is maintained within structures 212, 214, respectively. Directory structure 212 suitably contains an array of directory descriptor data structures, each corresponding to one directory within file system 205. Each directory descriptor contains information relating to the corresponding directory, such as operating system ownership and identity information, access permissions, time signatures, and the like. Directory descriptors may also include index values connecting the directory to its parent and/or child directories, to its textual name (e.g., an index to a text chain in textual data 210), and/or to its associated files and links. The structure may also contain an identifier of any sort, as well as a hash value, checksum or the like to verify the integrity of the structure. Other embodiments may provide additional or alternate information, and/or may be organized in a different manner entirely.

File data structure 214 similarly includes an array of file descriptor structures that each contain information describing a single file within file system 205. This information may include, for example, operating system ownership and group identities, access permissions and any time signatures, as well as index values connecting the structure to file name text (e.g., to a text chain in structure 210), to a parent directory and to other file descriptor structures associated with adjacent files as appropriate. Again, other embodiments may provide very different data values, attributes, and/or organizational schemes.

The sizes of structures 208, 210, 212 and 214 may be adjusted at startup and/or during operation as appropriate. Memory space is allocated for each structure in a conventional manner (e.g., a malloc call or the like), and as the space consumed by the structure approaches the allocation, file system 205 simply requests a larger allocation and then copies the data from the old allocation to the new, resetting any metadata indexes or other values as appropriate.

File system 205 suitably includes two process threads 216, 218 that execute in the background of computing system 102 on a relatively constant basis. Timing thread 218 simply resides in memory 110 (FIG. 1) and triggers actions in events thread 216 as appropriate. Such events may include storing event logs to storage device 104, as well as storing metadata snapshots, checking snapshots, and/or other actions as appropriate. Timing thread 218 may activate event thread 216 in any manner and at any periodic, aperiodic or other frequency. In an exemplary embodiment, timing thread 218 activates events thread 216 approximately every five seconds for log updates, and every thirty seconds or so for snapshot storage or integrity checking. Snapshot storage and checking may be staggered to even out the system workload, as appropriate. The particular events and timing used in other embodiments may differ significantly from those described herein.

Events thread 216 remains relatively inactive except when triggered by timing thread 218 or another process as appropriate. As noted above, events thread 216 contains programming to direct system 102 to perform disk validity checks, snapshot storage, snapshot verification and/or other tasks as appropriate. In various embodiments, events thread 216 begins the snapshot storage procedure by delaying the start of any write, rename, move or other processes that may affect the content of metadata 104. After all processes that are capable of modifying metadata 204 have completed, metadata 204 can be assumed to be stable, and ready for storage in data storage medium 104. The entire contents of metadata 204 can then be saved as a snapshot 230, 232, 234 on medium 104 using, for example, a single large block input/output (I/O) process, which is generally quite efficient to execute. After the snapshot is stored on medium 104, changes to metadata 204 can proceed normally. Additional detail about an exemplary events process 216 is presented below in conjunction with FIG. 4. In various equivalent embodiments, process threads 216 and 218 are combined with each other, or differently organized in any manner.

Snapshots 230, 232, 234 and other data may be stored on storage medium 104 in any manner. In various embodiments, file system 205 is capable of interacting with one or more drive volumes 104, each of which may appear as several "block devices". In a LINUX implementation, each block device may be represented as a unique "/dev/sda#" construct, for example. While only one active volume is shown in FIG. 2 for simplicity, the various structures shown could be readily duplicated for simultaneous or other operation with multiple block devices and multiple volumes, as desired.

In various embodiments, each block device includes a master boot record (MBR) 222 that is stored in one or more locations within the block device. MBR 222 is a data structure that contains information about the block device such as a signature or other identifier, a device number, file system version information, the size of the block device, a count of past read and/or write failures, any checksum information, and/or the like. MBR 222 may also contain one or more structures that indicate individual file systems or "partitions", each of which may specify a MAU size (e.g., in sectors) and also provide an index (e.g., relative to the start of block device /dev/sda#) to a starting and/or ending sector of the partition. Such a structure may also include sector identification (or indices) to metadata storage locations 230, 232, 234 and to a storage location for a log 224. In various embodiments, MBR 222 is stored on the partition of interest at logical block address (LBA) 0 and/or 1, and may also be stored toward the center and/or end of the partition to maximize physical separation on the drive media, and thereby reduce the likelihood of simultaneous error.

Each snapshot location 230, 232, 234 is any MAU, block or other location capable of storing a snapshot image of metadata 204. As noted above, snapshots of metadata 204 may be stored on a periodic or other temporal basis, and two or more snapshots (e.g., the three snapshots 230, 232, 234 shown in FIG. 2) may be maintained, with each snapshot location 230, 232, 234 being rotated such that newer snapshots continually replace the oldest snapshot in the rotation. In various embodiments, each snapshot 230, 232, 234 is designed to reside within a single MAU to ease storage and management.

In operation, then, file system 205 contains various actions 220 that are able to handle file and directory access by the user or any other processes executing on system 102. As files and directories residing on data storage device 104 are accessed or modified, metadata 204 about the affected files or directories is updated. By efficiently managing the metadata 204 and associated processes, the metadata 204 can be maintained in system memory 110 (FIG. 1) for efficient access. The modified metadata 204 is stored as snapshots 230, 232, 234 to the media 104 by an event process 216 or the like.

Management of metadata 204 by file system 205 is described with reference to FIG. 3, which shows one example of a data structure that could be used to represent partition data 206 described above. As noted above, partition data 206 includes any sort of information relevant to the entire partition of block device 114 on storage media 104. Such information may include, without limitation, the various features and elements shown in FIG. 3, which generally corresponds to the three-snapshot embodiment shown in FIG. 2. The particular data values represented in FIG. 3 are intended as arbitrary examples, however, as are the exemplary byte values and offsets presented in the figure. Alternate embodiments may therefore include additional or alternate features, and/or may omit some or all of the features shown in FIG. 3 entirely. Moreover, the organization, order and layout of the structure shown in FIG. 3 is purely exemplary, so other embodiments may be organized in widely different manners. Still further, "management" of metadata 204 need not involve all of the actions described with respect to FIG. 3. To the contrary, management of metadata 204 could encompass any process of updating a set of file system metadata 204 in a memory 110 or the like as files are opened, closed, modified, deleted, etc.

Turning to the exemplary data fields 301-350 shown in FIG. 3, fields 301, 302, 303 represent checksums, hash values or other validation codes computed for the three stored snapshots 230, 232, 234 (FIG. 2). Such codes may be computed according to any sort of checksum, digest, digital signature or other routine while (or shortly after) the snapshot is created, and the resultant value may be stored for subsequent retrieval and comparison to a code computed according to the same algorithm at a later time to ensure that the data has not changed since being written.

Field 304 contains a partition name, which is typically retrieved from MBR 222 (FIG. 2). The partition name may be stored in a data structure of fixed length (e.g., the sixteen byte field 304 shown in FIG. 3), or using the text block structures 210 described above.

Field 305 defines a sequence in which the saved snapshots 230, 232, 234 are stored and/or retrieved.

Field 306 is the MAU size, represented in disk sectors or other appropriate values.

Fields 307, 308 and 309 contain information relating to the start and end locations of the partition, as well as the size of the partition, relative to the start and size of the block device.

Fields 310, 311, 312 and 313 contain lists of MAUs that are available (field 310), and that were freed in prior snapshot cycles (fields 311-313). Because snapshots are stored, at least in part, for the purpose of crash recovery, it is typically undesirable to create any conditions that would make recovery from a snapshot image difficult. If de-allocated MAUs were immediately re-assigned to new data files or the like, confusion or data corruption could occur if the system 102 needed to revert to a prior version of the snapshot in which that MAU was assigned to different data. Hence, de-allocated MAUs are not re-assigned until all of the snapshots that show the MAU as being allocated have been replaced.

Fields 314, 315, 316 and 317 are indexes to the beginnings of the FAT table 208, text data 210, directory data 212 and file data 214 described above. The starting addresses of the various tables and other data contained in those structures can therefore be readily accessed. In various embodiments, the various structures 208, 210, 212, 214 may efficiently reference addresses in memory through the use of indexes rather than absolute addresses or address pointers that are more conventionally used in the prior art. By storing indexes instead of pointers or absolute addresses, at least two benefits can be realized. First, indexes are generally smaller in size than addresses, thereby making the metadata more compact. This added compactness, in turn, makes the metadata easier to contain in memory and easier to move to and from the disk when saving or booting. Moreover, indexes need not typically be recalculated when the location of metadata in memory changes. During a boot, for example, different locations of metadata in memory can be readily accommodated by simply storing a base address for the new location; indexes from this base address will typically not change. In many embodiments, then fields 314, 315, 316 and 317 may be the only fields that will need address (re)calculation when metadata is loaded at boot time, or expanded during run time.

Field 318 simply maintains the current size of the metadata snapshot.

Field 319 represents the size of the FAT array.

Field 320 represents the current memory location of metadata 204.

Field 321 maintains the number of sector numbers from the start of the block device in LINUX or UNIX implementations.

Field 322 contains a count of metadata changes since the last snapshot 320, 322, 324 was saved to storage device 104.

Field 323 contains a counter or other value that is designed to facilitate creation of unique "handles," e.g. unique numeric values, for the various files being read. In embodiments wherein multiple users or processes may request simultaneous read access to a particular file or directory, file system 205 suitably creates a separate instance of the metadata associated with the file or directory for each user. Each instance is referred to by a "handle", and each handle is unique to avoid confusion and conflict. By pre-pending, appending and/or otherwise incorporating a counter, pseudo-random number or other value into the handle, conflicts resulting from duplicate handles can be avoided.

Fields 324, 325, 326 and 327 related to text information 210 (FIG. 2). Field 324 contains the size of the text chain array maintained in structure 210, and field 325 contains the index of the first free structure in the array. Field 326 similarly contains the index of the last free structure, and field 327 contains a count of free text chain structures.

Fields 328, 329, 330 and 331 similarly contain information about the directory descriptor array 212 (FIG. 2), including the size of the array 328, the index 329 of the first free structure, the index 330 the last free structure, and a count 331 of the number of free structures in the array 212. Fields 332, 333, 334, 335 contain analogous information for the file descriptor array 214.

Field 336 indicates the number of sectors/MAUs allocated per snapshot 330, 332, 334. In various embodiments, this value will indicate that a single MAU is allocated to each snapshot 330, 332, 334, although alternate embodiments could use different values.

Fields 337 and 338 describe the number of active operations that do and do not (respectively) affect metadata 204. This information is useful when preparing or storing the snapshots 230, 232, 234, since it is typically not desirable to store the snapshot while the metadata 204 is still subject to change.

Fields 339 and 340 relate to the file system check (fsck) utility that is used to verify the integrity of snapshots and/or files stored on storage media 104.

Fields 341, 342, 343 are flags that can be set or reset to block user operations, metadata changes and/or write operations in general. These flags are typically set during preparation and storage of snapshots 230, 232, 234 to prevent corruption or confusion of data. The flag of field 343 prevents all changes from occurring, and may be set at any appropriate time (e.g. during a period when the disk volume's reliability has become questionable).

Fields 344, 345, 346, and 347 relate to MAU definition and operation.

Fields 348 and 349 are indexes to information about the partition.

Field 350 is simply a padding field that can be used to round up the size of the data stored in structure 206 to a number evenly divisible by, e.g., 4; this can, in some systems, facilitate placing other data structures, e.g. the file allocation table 208, contiguously with the partition data 204. Again, the various data fields, labels, byte allocations and offsets shown in FIG. 3 are optional and purely for exemplary purposes, and need not be present in all embodiments.

Figure 4:
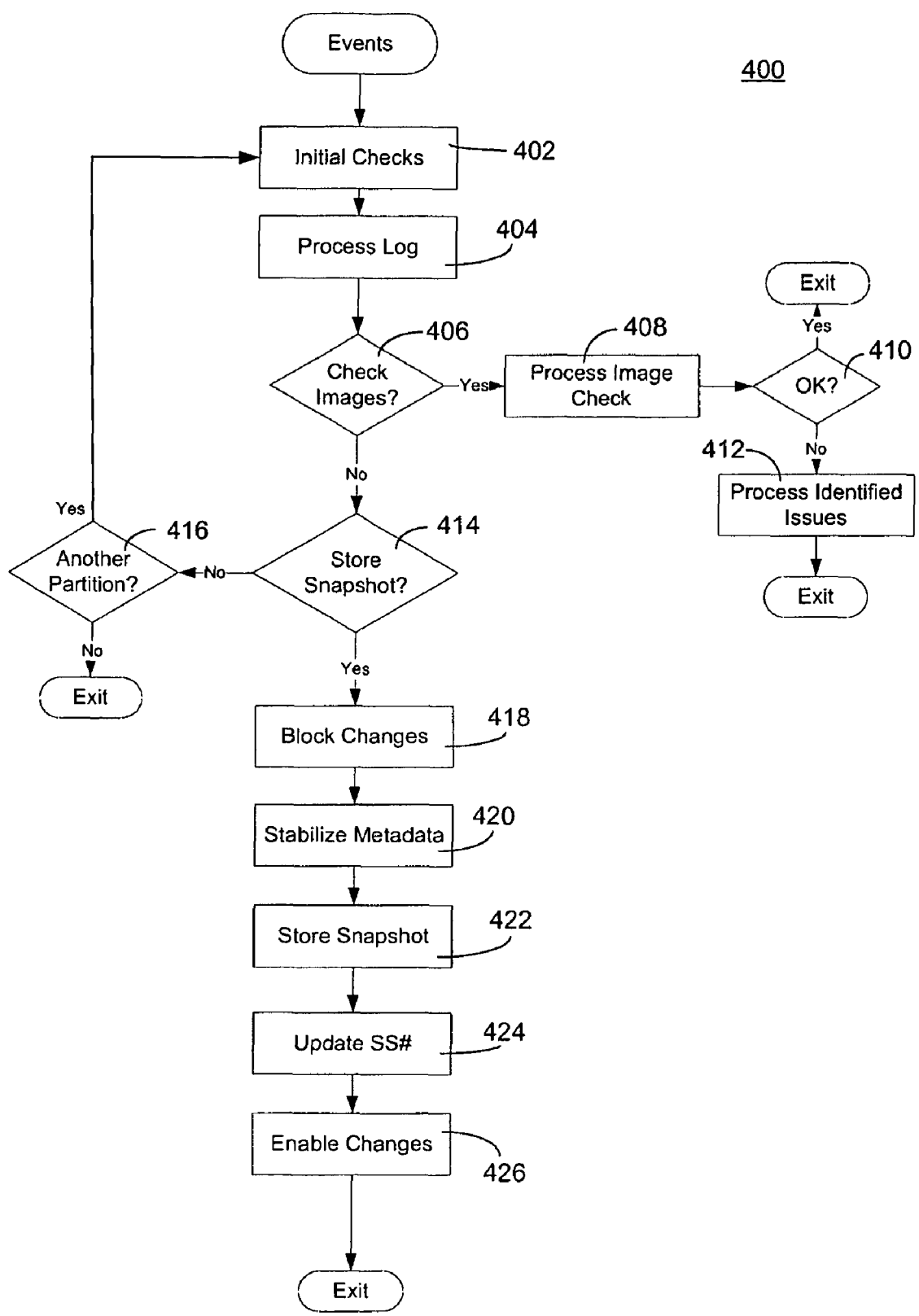
FIG. 4 is a flowchart of an exemplary event handling process.

Turning now to FIG. 4, an exemplary process 400 that could be executed by event thread 216 (FIG. 2) suitably includes the broad steps of performing initial checks (step 402), checking snapshot images saved on the storage medium (step 408), and storing snapshots (step 422) as appropriate. The various method steps shown in FIG. 4 may be implemented on a digital computer, for example on a computing system 102 as described above. More specifically, the various steps in method 400 may be performed within an event thread 216 or another component of file system 205 that is embodied in software stored in memory 110 and/or storage medium 104, and that executes on processor 108 (FIG. 1) or any other processor as appropriate. The steps shown in FIG. 4 are intended as logical steps that may be carried out by one or more distinct processing routines, devices, modules or the like, and that may be carried out in any temporal order, including any order different from the exemplary embodiment illustrated in FIG. 4.

As noted above, event thread 216 is typically inactive until activated by timing thread 218 (FIG. 2) or other logic as appropriate. This may be accomplished, for example, through the use of a semaphore or other structure (e.g., a WHILE (TRUE) loop or the like) wherein the calling thread controls and releases the semaphore as appropriate to achieve desired results from event thread 216. In an exemplary embodiment, timing thread 218 releases the semaphore or otherwise calls event thread 216 approximately every five seconds, with snapshots 230, 232, 234 being created approximately every thirty seconds and file system checks also being executed at approximately the same frequency but out of phase with the snapshot creation and storage. Again, different embodiments may use any other timing values and parameters.

In various embodiments, process 400 begins by initially checking the disk or other storage medium 104 (step 402). Initial checks 402 may additionally or alternately check metadata 204, and/or any other features of computing system 102 as desired. Checks may include simple verification that the feature is still active (e.g., through a simple read or write test), or may take any other actions as desired.

Various embodiments also maintain a log file (step 404) that can be traced in the event of a crash or other adverse event to determine what caused the event, and/or to assist in any recovery that may be necessary. Information contained in the log file may include any listing of processes begun and/or completed, or any other actions taken by system 102 or any component thereof The log file may be maintained in memory (e.g., memory 110 (FIG. 1)) temporarily until step 404 occurs, at which time the log may be written to storage medium 104 as log file 224 (FIG. 2).

As noted above, some or all of the disk partition on storage medium 104 may be checked on any temporal or other basis (step 406). In some embodiments, such checks may occur in response to known or suspected issues. Upon detecting a read or write error on storage medium 104, for example, it may be desirable to run a check of the snapshot data or the entire partition to ensure that no corruption has occurred. In many embodiments, however, the image check (step 408) is simply performed on a regular temporal basis. The check itself may involve running a file system check (e.g., fsck) program on the partition, or on the snapshot images 320, 322, 324 as desired. If no issues are identified (step 410), the routine exits, if desired, or continues elsewhere. If issues are found during the file system check, these issues are addressed as appropriate (step 412). The issues may be repaired, for example, or may be flagged for further attention, or otherwise addressed as desired. In various embodiments, completion of verification need not terminate the routine, but instead may direct operation to steps 402, 404, 414 and/or elsewhere as appropriate for further processing on the same or a different partition.

Snapshots 230, 232, 234 may also be stored on any temporal basis (step 414). As noted above, snapshots 230, 232, 234 represent the stored metadata 204 for files, directories and other elements of file system 205. Snapshots 230, 232, 234 may be stored on a regular temporal basis (e.g., storing a new snapshot every thirty seconds or every minute, although other embodiments could use any timeframe). In other embodiments, snapshots are stored when a lull in activity is discovered so as to minimize any adverse effects upon the performance of system 102.

Generally speaking, it is desirable to stabilize the metadata 204 before storing the metadata 204 to a snapshot 320, 322, 324. This may be accomplished, for example, by blocking new actions that may affect the metadata 204 (step 418), and then waiting for any pending actions to complete such that the metadata is in a stable state (step 420). With momentary reference to FIG. 3, changes can be blocked by setting flags 341 and 342 for the duration of the storing process. Setting these flags creates an effect similar to that produced by a mutual exclusion (mutex) or interrupt mask; pending actions are simply queued for subsequent processing, or otherwise handled as appropriate.

When the metadata 204 is stable, snapshot 320, 322 or 324 is stored to data storage device 104 (step 422). After writing the snapshot, the resulting file may be checked (e.g., to confirm a checksum, hash or other code). If the snapshot is successfully verified, then the snapshot numbers in partition data 206 may be updated as appropriate (step 424). Sequence value 305 may be updated, for example, and/or the free MAU data in fields 310-313 can be updated to reflect the most recent storage. As noted above, MAUs freed during prior snapshot periods will not typically be available for subsequent use until all snapshots 230, 232, 234 that show the MAU as allocated have been overwritten. As such, the structures containing recently-freed MAUs will be cycled as appropriate. After the snapshot 320, 322, 324 is written to the data storage medium 104 and any associated accounting is complete, flags 341 and 342 may be cleared, or any other actions may be taken to resume normal activity, including updates to metadata 204 (step 426).

Figure 5:
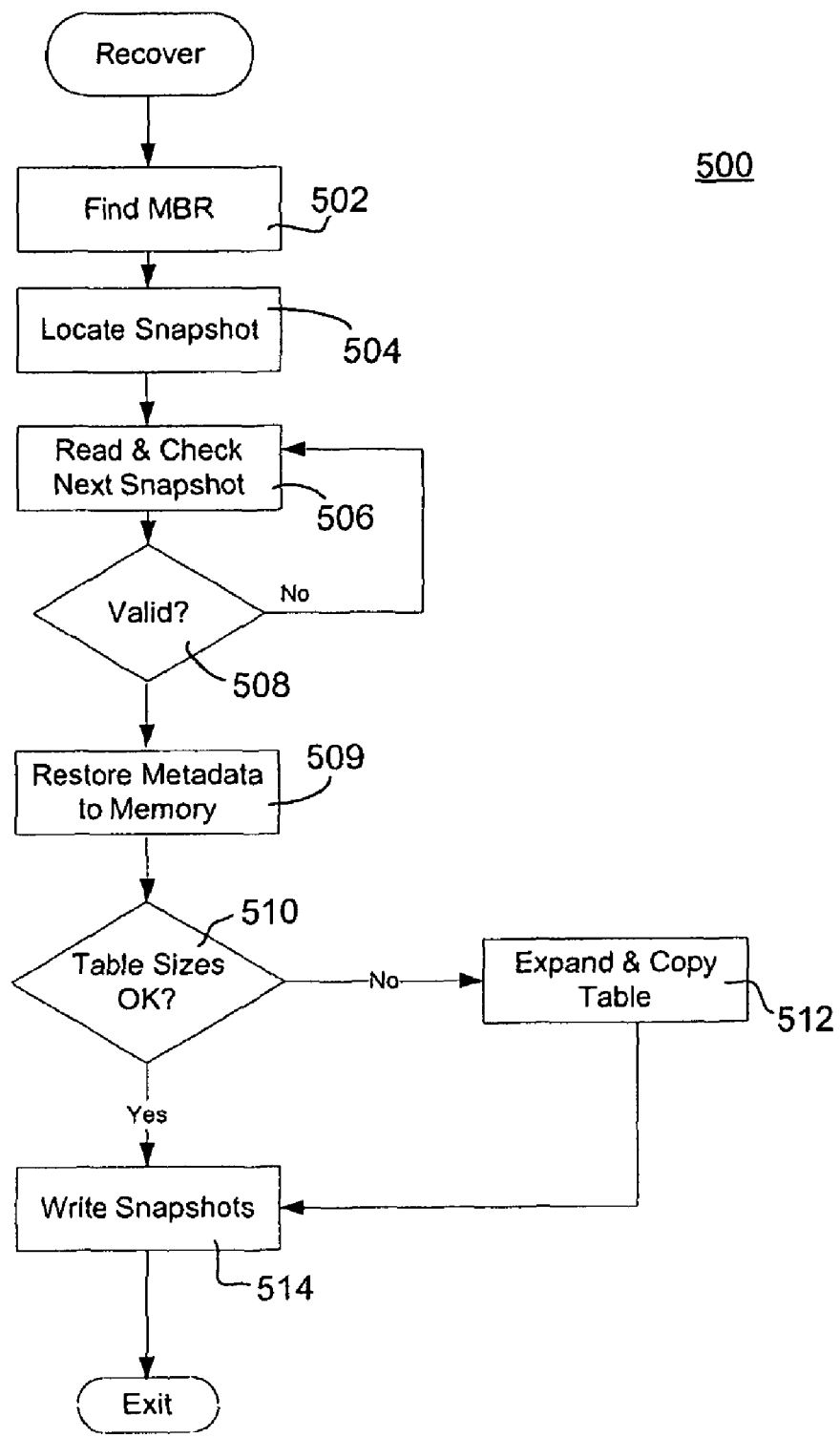
FIG. 5 is a flowchart of an exemplary recovery process.

FIG. 5 is a flowchart showing an exemplary method 500 for recovering metadata 204 in memory 104 following a crash, reboot or other event. Method 500 is generally implemented in software code stored in storage medium 104 and/or memory 110 that is able to be executed on processor 108 and/or any other processing logic as appropriate.

Method 500 suitably includes the broad steps of finding the MBR 222 on the partition of interest (step 502), locating one or more snapshots 230, 232, 234 on the partition (step 504), identifying a valid snapshot on the partition (steps 506, 508), adjusting any data table sizes as appropriate (steps 510, 512), and writing snapshots of the restored metadata back to the storage medium 104 (step 514). Additional or alternate steps may also be provided, and the steps shown in FIG. 5 may be executed in a different temporal or logical order from that shown in the figure.

Recover process 500 may be initiated in any manner. In various embodiments, process 500 occurs automatically at startup of computing system 102, prior to the standard operation of the device. The process 500 may therefore be initiated by any sort of startup script, daemon, process or the like in any manner. Process 500 may also be initiated anytime that it is desired to restore prior metadata from storage medium 104 to memory 110. This may occur, for example, when errors are identified in memory 110 or whenever the stability or reliability of metadata 204 is called into question.

The process 500 of recovering metadata 204 from a disk partition or the like suitably begins by obtaining information about the partition from its MBR 222 (FIG. 2). Identifying an MBR 222 on any block device 114 of storage volume 104 is accomplished in any manner (step 502). In various embodiments, MBR 222 is stored in one or more known locations (e.g., the first, second and/or last logical block address in the partition, although any other pre-determined location could be used in other embodiments). As noted above, MBR 222 contains, among other things, indices to aid in the location of snapshots 230, 232 and/or 234 that may be stored within each of one or more partitions. These index values contained within MBR 222 can therefore be used to locate snapshots 230, 232, 234 (step 504) in any appropriate manner. Typically, snapshots 230, 232 and 234 are stored within particular MAUs of a partition; these particular MAU locations may be pre-determined in some embodiments, or simply indexed within the MBR 222, as noted above.

When the locations of the snapshots 230, 232, 234 are known, one or more snapshots 230, 232, 234 can be read and evaluated (step 506) to ensure that the snapshot remains valid (step 508). Validity checking may be performed by executing a checksum or hash verification, by executing a fsck or other check as described above, or in any other appropriate manner.

Step 506 may be repeated for any number of snapshots stored on any of the partition(s) as appropriate (step 508). In various embodiments, step 506 is repeated as appropriate to determine the most recent valid snapshot that is stored on a particular partition. In various embodiments, the most recent snapshot is first evaluated; if that snapshot fails the verification, the next most recent is evaluated, and so on until a valid snapshot is found, or until all snapshots have been evaluated. When a valid snapshot is identified in step 508, the contents of the valid snapshot can be read from device 104 and written in memory 110, thereby restoring that partition's valid metadata 204 (step 509). Step 514 may also involve saving copies of the valid snapshot to the other snapshot storage locations on the partition to prevent corrupt or outdated metadata from being used. Other actions may be taken as appropriate to adjust available or non-available MAUs, or other parameters as appropriate.

In various embodiments, the startup process also involves adjusting the sizes of the various table structures (e.g., table structures for storing text 210, directory descriptors 214, and/or file descriptors 214 as described above in conjunction with FIG. 2). Such action may be taken if the size of any table structure is nearing its allocated limit; this may be determined, for example, by comparing any counts of free data structures available (e.g., the values stored in data fields 327, 331, and/or 335 in FIG. 3) with any appropriate threshold amounts. If any tables are becoming uncomfortably filled, a larger structure can be requested (e.g., with a conventional malloc request, and the existing array can be conveniently copied into the new structure. As noted above, re-sizing may also be carried out during the events thread 216 or at any other time during operation; in various embodiments, however, the table expansion thresholds are more generous (i.e., more likely to increase the size of the table) at startup to encourage the reallocation and copying that occurs at startup to forestall the need for a reallocation during operation, when delays associated with copying may be more noticeable to the customer.

In summary, then, new file management systems and techniques are described that allow for efficient management of metadata primarily, if not exclusively, in system memory. This is enabled by, for example, efficient allocation of memory used in storing text and other lists, and through the use of efficient file allocation tables that can be stored in memory, particularly in set-top box environments and other applications that expect to manage a relatively low number of total files. In addition to maintaining file system metadata in memory, one or more snapshot images can be periodically or otherwise stored to disk or other convenient mass storage to allow for convenient and effective restoration of metadata following a crash, reboot or other event.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A computer-implemented method of managing a plurality of files associated with a computer system, wherein the computer system comprises a memory and a data storage medium distinct from the memory that is configured to store the plurality of files, the method comprising:

managing a collection of current metadata in the memory during operation of the computer system, the collection of current metadata comprising current information associated with each of the plurality of files stored in a file system on the data storage medium, and wherein the current information changes as the files are opened, closed and modified during operation of the computer system;

storing a current snapshot of the collection of current metadata to the data storage medium, wherein the current snapshot comprises the complete metadata describing each of the plurality of files in the file system; and following a reboot of the computer system, recovering the collection of complete metadata to the memory from the snapshot of the collection of complete metadata stored on the data storage medium to thereby restore the entire file system of the data storage medium for subsequent operation.

2. The method of claim 1 wherein the recovering comprises validating the current snapshot and, if the snapshot is not valid, reading and checking an additional snapshot stored on the data storage medium prior to the storing of the current snapshot.

3. The method of claim 1 wherein the recovering takes place following a crash of the computer system.

4. The method of claim 1 wherein the storing comprises automatically storing the current snapshot on a periodic basis.

5. The method of claim 1 wherein the storing comprises storing multiple snapshots of the collection of metadata at different times from each other to thereby preserve the multiple snapshots on the data storage medium.

6. The method of claim 5 wherein the managing comprises ensuring that portions of the data storage medium that are de-allocated during operation of the computing system prior to storing the current snapshot are not allocated during subsequent operation while the current snapshot remains one of the multiple snapshots stored on the data storage medium.

7. The method of claim 5 wherein the recovering comprises validating a first one of the multiple snapshots and, if the first one of the multiple snapshots is not valid, then validating a second one of the multiple snapshots and, if the second one of the multiple snapshots is valid, recovering the collection of metadata to memory from the second one of the multiple snapshots.

8. The method of claim 7 further comprising, if the second one of the multiple snapshots is valid, then validating a third one of the multiple snapshots and, if the third one of the multiple snapshots is valid, then recovering the collection of metadata to memory from the third one of the multiple snapshots.

9. The method of claim 7 wherein the third one of the multiple snapshots is stored prior to the second one of the multiple snapshots, and wherein the second one of the multiple snapshots is stored prior to the first one of the multiple snapshots.

10. The method of claim 1 wherein the access to the entire collection of metadata is permitted from the memory without access to the data storage medium, during operation of the computer system.

11. The method of claim 1 wherein the collection of metadata comprises a plurality of names, and wherein each of the plurality of names are represented within the collection of metadata by one or more text blocks, each text block comprising a text portion and an index portion.

12. The method of claim 11 wherein the index portion of at least one of the text blocks representing one of the plurality of names comprises an index to another text block representing the same one of the plurality of names.

13. The method of claim 1 wherein the collection of metadata is formatted with a plurality of index values.

14. The method of claim 1 wherein the storing comprises temporarily blocking any changes to the collection of metadata, stabilizing the collection of metadata and writing the current snapshot to the data storage medium while the changes are blocked.

15. A computer system comprising:
- a data bus;
- a memory coupled to the data bus;
- a data storage medium coupled to the data bus and configured to store a plurality of files in a file system; and
- a processor configured to format a collection of metadata comprising information describing each of the plurality of files stored on the data storage medium that changes as each file is opened, closed and modified, to maintain the collection of current metadata for the entire file system in the memory during operation of the computer system that is updated as each file is opened, closed and modified, and to periodically store a snapshot of the collection of current metadata to the data storage medium so that all of the current metadata describing each of the files in the entire file system is maintained on the data storage medium.

16. The computing system of claim 15 further comprising an interface to a received audio/visual signal and an interface to a display, and wherein the processor is further configured to produce imagery on the display in response to the received audio/visual signal.

17. The computing system of claim 16 wherein the processor is further configured to store a program received via the received audio/visual signal on the data storage medium as at least one of the plurality of files.

18. The computing system of claim 15 wherein the data storage medium has an associated number of minimum allocation units (MAUs), and wherein the snapshot of the collection of metadata is stored on the data storage medium within one or more MAUs.

19. The computing system of claim 15 wherein the data storage medium has an associated number of minimum allocation units (MAUs), and wherein the processor is further configured to store a plurality of snapshots of the collection of metadata on the data storage medium at different times from each other, wherein each snapshot of the collection of metadata is stored within one or more reserved MAUs.

20. The computing system of claim 15 wherein the processor is further configured to permit access to the entire collection of metadata from the memory without access to the data storage medium during operation of the computer system.

21. The computing system of claim 15 wherein the collection of metadata comprises a plurality of names, and wherein each of the plurality of names are represented within the collection of metadata by one or more text blocks, each text block comprising a text portion and an index portion, and wherein the index portion of at least one of the text blocks representing a part of one of the plurality of names comprises an index to another text block representing a subsequent part of the same one of the plurality of names.

22. A computer system for producing imagery on a display in response to a received audio/visual signal comprising at least one program, the computer system comprising:
- an input interface configured to receive the audio/visual signal;
- a video interface configured to provide an output signal representative of the imagery to the display;
- a memory;
- a disk drive configured to store a plurality of files in a file system; and
- a processor in communication with the input interface, the video interface, the memory and the disk drive, wherein the processor is configured to generate the output signal in response to the received audio/visual signal, to store the at least one program as one of the plurality of files in the file system on the disk drive, to maintain a collection of metadata for the entire file system comprising information describing each of the plurality of files stored in the file system that changes as each file is opened, closed and modified, to periodically store a plurality of snapshots of the collection of metadata to the data storage medium so that all of the current metadata describing each of the files in the entire file system is maintained on the data storage medium, and to recover the collection of metadata from at least one of the plurality of snapshots following a reboot of the computer system, wherein all of the metadata describing each of the files in the file system is stored entirely in the memory during standard operation of the computer system.

* * * * *